United States Patent
Swei et al.

(10) Patent No.: US 9,776,430 B2
(45) Date of Patent: Oct. 3, 2017

(54) POST-PRINTING TREATMENT

(71) Applicant: HEWLETT-PACKARD DEVELOPMENT COMPANY, L.P., Houston, TX (US)

(72) Inventors: Jason Swei, San Diego, CA (US); Xi Zeng, San Diego, CA (US); Tao Chen, San Diego, CA (US); Sandeep K Bangaru, San Diego, CA (US); Eric L Burch, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/651,178

(22) PCT Filed: Dec. 20, 2012

(86) PCT No.: PCT/US2012/071090
§ 371 (c)(1),
(2) Date: Jun. 10, 2015

(87) PCT Pub. No.: WO2014/098879
PCT Pub. Date: Jun. 26, 2014

(65) Prior Publication Data
US 2015/0336400 A1    Nov. 26, 2015

(51) Int. Cl.
*B41J 11/00* (2006.01)
*C09D 11/12* (2006.01)
*C09D 11/40* (2014.01)

(52) U.S. Cl.
CPC .......... *B41J 11/002* (2013.01); *B41J 11/0015* (2013.01); *C09D 11/12* (2013.01); *C09D 11/40* (2013.01)

(58) Field of Classification Search
CPC .................. B41J 2/01; B41J 11/0015
See application file for complete search history.

(56) References Cited

U.S. PATENT DOCUMENTS

| | | | |
|---|---|---|---|
| 3,819,530 | A | 6/1974 | Ratledge et al. |
| 3,971,733 | A | 7/1976 | Hawkins |
| 4,484,948 | A | 11/1984 | Merritt et al. |
| 4,684,956 | A | 8/1987 | Ball |
| 5,345,254 | A | 9/1994 | Wong et al. |

(Continued)

FOREIGN PATENT DOCUMENTS

| | | |
|---|---|---|
| CN | 1608113 | 4/2005 |
| CN | 101080468 | 11/2007 |

(Continued)

OTHER PUBLICATIONS

Brancher Overprint Varnishes, Branoher—Printing Inks Co., http://www.brancher.com/-Overprint-Varnishes-html?lang=en, 1 page.

(Continued)

*Primary Examiner* — Kristal Feggins
*Assistant Examiner* — Kendrick Liu
(74) *Attorney, Agent, or Firm* — Thorpe, North & Western L.L.P.

(57) ABSTRACT

A post-printing treatment for printed media includes a wax suspended in water. Particles of the wax to lie upon at least an inkjet ink image on the printed media to facilitate abrasion resistance of the image.

18 Claims, 2 Drawing Sheets

(56) References Cited

U.S. PATENT DOCUMENTS

| | | | |
|---|---|---|---|
| 5,746,812 A | 5/1998 | Müller et al. | |
| 6,245,384 B1 | 6/2001 | Lott | |
| 6,303,185 B1 | 10/2001 | Banning et al. | |
| 6,513,924 B1 | 2/2003 | Goldberg et al. | |
| 7,578,587 B2 | 8/2009 | Belelie et al. | |
| 2002/0115015 A1* | 8/2002 | Romano, Jr. | B41M 7/0027 430/200 |
| 2004/0056940 A1* | 3/2004 | Rutland | B41J 11/0015 347/102 |
| 2004/0249018 A1 | 12/2004 | Kataoka | |
| 2008/0074453 A1* | 3/2008 | Furukawa | B41J 2/2142 347/14 |
| 2008/0252680 A1* | 10/2008 | Schmid | B41J 2/04 347/20 |
| 2009/0130313 A1 | 5/2009 | Ohshima et al. | |
| 2009/0162555 A1* | 6/2009 | Halfyard | G03G 8/00 427/288 |
| 2009/0252966 A1 | 10/2009 | Oguchi et al. | |
| 2011/0043584 A1* | 2/2011 | Silverbrook | B41J 3/60 347/104 |
| 2011/0205290 A1* | 8/2011 | Tojo | C09D 11/322 347/21 |
| 2012/0050433 A1* | 3/2012 | Fujikura | B41J 3/60 347/102 |
| 2012/0128949 A1 | 5/2012 | Goto | |
| 2012/0176455 A1* | 7/2012 | Ohta | B41M 5/0011 347/102 |
| 2013/0176369 A1* | 7/2013 | Gotou | B41J 2/2107 347/100 |
| 2013/0330526 A1* | 12/2013 | Song | C09D 5/024 428/205 |
| 2014/0015894 A1* | 1/2014 | Sisler | C09D 133/10 347/20 |

FOREIGN PATENT DOCUMENTS

| | | |
|---|---|---|
| CN | 102407663 | 4/2012 |
| CN | 102574406 | 7/2012 |
| EP | 1547795 | 6/2005 |
| KR | 10-2004-0044897 | 5/2004 |
| WO | WO-2010114899 A1 | 10/2010 |

OTHER PUBLICATIONS

Lubrizol Performance Coatings, The Lubrizol Corporation, http://lubrizol.com/Coatings/Technologies.html, 1 page.

Zala, Krista, et al., "Laser-Printed Labels in Wet Collections: Will They Hold Up?", Collection Forum, 2005, pp. 49-56, vol. 19,(1-2).

* cited by examiner

POST-PRINTING TREATMENT

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printing of print media includes a heat cycle when drying an inkjet ink image on the print media. Drying the inkjet ink image on the print media may rob the print, media of moisture while sufficiently drying the image, especially when using aqueous inkjet inks on paper media. As such, the moisture content of the print media may be low when it exits the inkjet printer as printed media. In some cases, the printed media may become one or both of brittle and deformed from the drying cycle, and then damaged during further processing or handling. To address this, a moisturizer is used, e.g., an in-line moisturizer, that deposits droplets consisting of water on the dried printed media to restore some moisture content to the printed media.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1:
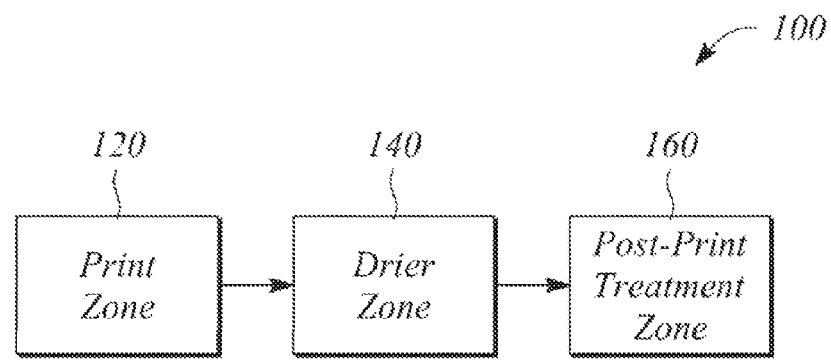
FIG. 1 illustrates a block diagram of an inkjet printer having a post-printing treatment according to an example in accordance with the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein are directed to a post-printing treatment for printed media. In particular, the post-printing treatment includes a fluid that comprises wax suspended in water. The post-printing treatment fluid is dispensed to a primed media, which includes a printed and dried inkjet image on media, in an amount that is sufficient for both the water to be absorbed by the media and particles of the wax to lie upon at least the image. The particles of wax on the image facilitate abrasion resistance of the image, without curing or application of pressure to the wax. The post-printing treatment is useful on printed media having images formed from aqueous inkjet ink on paper-based media using an inkjet printer, for example. The post-printing treatment according to the principles described herein is directly adaptable to a moisturizer zone of an inkjet printer, for example. In some examples, the moisturizer zone is inline to the inkjet printer, for example, to an inkjet web press. In other examples, the moisturizer zone is off-line to the inkjet printer. The post-printing treatment according to the principles herein may substitute for the moisturizer zone without high hardware cost or long product development. Printed media that includes the post-printing treatment according to the principles described herein may have improved durability.

As used herein, the article 'a' is intended to have its ordinary meaning in the patent arts, namely 'one or more'. For example, 'a wax' generally means one or more waxes and as such, 'the wax' means 'the wax(es)' herein. The phrase 'at least' as used herein means that the number may be equal to or greater than the number recited. The phrase 'no greater than' as used herein means that the number may be equal to or less than, the number recited. The term 'about' as used herein means that the value recited is within the normal tolerances of the equipment used to measure the value; or in some examples, the value may differ by plus or minus 20%, or plus or minus 15%, or plus or minus 10%, or plus or minus 5%, or plus or minus 1%, for example. Any ranges of values provided herein, include values within or between the provided ranges. The term 'substantially' as used herein means a majority, or almost all, or all, or an amount with a range of about 51% to about 100%, for example.

Also, any reference herein to 'top', 'bottom', 'upper', 'lower', 'up', 'down', 'back', 'front', 'left' or 'right' is not intended to be a limitation herein. The designations 'first' and 'second' if used herein is for the purpose of distinguishing between items and are not intended to imply any sequence, order or importance to one item over another item or any order of operation, unless otherwise indicated. Moreover, examples herein are intended to be illustrative only and are presented for discussion purposes and not by way of limitation.

According to some examples of the principles described herein, a post-printing treatment to printed media is provided. The post-printing treatment, includes a fluid that comprises a wax suspended in water. The fluid may be an aqueous wax suspension or dispersion, an aqueous wax emulsion, or an aqueous wax aerosol or particulate, depending on the example, wherein the fluid contains particles of the wax that are readily separable from, the water, especially after being dispensed. For simplicity of discussion herein, the phrase 'a wax suspended in water' is intended to include within its scope a wax suspension, a wax dispersion, a wax emulsion, a wax aerosol, or a combination or mixture of two or more thereof, unless otherwise indicated.

The wax suspended in water includes, but is not limited to, particles of a synthetic wax, a natural wax, a combination of a synthetic wax and a natural wax, a mixture of a synthetic wax and a natural wax, a combination or a mixture of two or more different synthetic waxes, or a combination or a mixture of two or more different natural waxes, for example. In some examples, the synthetic wax includes, but is not limited to, polyethylene, polypropylene, polybutadiene, polytetrafluoroethylene, polyvinylfluoride, polyvinylidene, fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, or polyester resin. In some examples, the natural wax includes, but is not limited to, carnauba wax, paraffin wax, montan wax, candelilla wax, ouricury wax, sufarcane wax, retamo wax, or beeswax.

The amount of wax in the post-printing treatment fluid is with a range of about 10% to about 90% dry weight, for example. In some examples, the amount of wax in the post-printing treatment fluid is with a range of about 10% to about 80%, or about 10% to about 70%, or about 10% to about 60%, or about 10% to about 50%, or about 10% to about 40%, or about 10% to about 30% dry weight. In some examples, the amount of wax in the post-printing treatment fluid is with a range of about 20% to about 90%, or about 30% to about 90%, or about 40% to about 90%, or about 50% to about 90% dry weight. In some examples, the amount of wax in the post-printing treatment fluid is with a range of about 20% to about 80%, or about 30% to about 75%, or about 40% to about 60% dry weight. In some examples, the post-printing treatment fluid has a total solids content (by weight) that is within a range of about 1% to about 10%, or about 2% to about 9%, or about 3% to about 8%, or about 4% to about 7%. For example, the total solids content of the post-printing treatment, fluid may be about 5% to about 6%, by weight, in some examples.

In some examples, the post-printing treatment, fluid further comprises one or both of an additive and a polymeric binder. The additive that may be included in the post-printing treatment fluid includes, but is not limited to, a surfactant (or wetting agent), a defoamer (or anti-foaming agent), a rheology modifier, a pH control agent, a dispersant (or dispersing agent), a combination, of two or more thereof, or a mixture of two or more thereof, for example. Examples of surfactants that may be included as an additive include, but are not limited to, Tego® Wet 510 from Evonik Industries AG, Essen, Germany, and APG® 325 N from Cognis Corp., North Rhine-Wesphalia, Germany. Examples of defoamers that may be included as an additive include, but are not limited to, Deairex 3040 from Houghton Vaughan Ltd., Manchester, UK, and Foamaster® VF from Cognis Corp. Examples of rheology modifiers that may be included as an additive include, but are not limited to, Sterocoll® FS from BASF, USA, and Eka Flow 1.265 from Eka Chemicals, AkzoNobel, USA. Examples of pH control agents that may be included as an additive include, but are not limited to, a buffer, for example of sodium hydroxide, ammonium hydroxide, or acetic acid. Examples of dispersants that may be included as an additive in the post-printing treatment fluid include, but are not limited to, Acumer™ 9300 from Dow Chemical Corp., USA, and Dispex® N40V from Ciba Canada, Ltd., Ontario, Canada.

The amount and type of additive that may be included in the post-printing treatment fluid may depend in part on the nature and type of wax that is used, for example. In some examples, the amount and type of additive included may depend on whether the post-printing treatment fluid further comprises a polymeric binder. In some examples, the total amount of additive (collectively) that may be included in the post-printing treatment fluid is within a range of about 0.001% to about 10% dry weight, for example. In some examples, the total amount of additive that may be included is within a range of about 0.01% to about 10%, or about 0.1% to about 10%, or about 0.5% to about 10%, or about 1% to about 10% dry weight. In some examples, the total amount of additive that may be included is within a range of about 0.001% to about 9%, or about 0.001% to about 8%, or about 0.01% to about 7%, or about 0.01% to about 6%, or about 0.01% to about 5%, or about 1% to about 8% dry weight.

In examples of the post-printing treatment fluid that further comprises a polymeric binder, the polymeric binder may be a water soluble binder, a water dispersible binder, a combination of a water soluble binder and a water dispersible binder, or a mixture of a water soluble binder and a water dispersible binder. Whether a polymeric binder is included in the post-printing treatment fluid of some examples herein may depend in part on one or more of the type of inkjet printing, the type of media substrate, the type of wax, and the aqueous inkjet ink used.

For example, for a media substrate comprising a paper base (i.e., a cellulose fiber base), for example a coated paper media, that is printed with aqueous inkjet ink using high speed inkjet printing, for example at a speed of about 60 meters per minute, there is an inorganic salt in the coating layer of the coated paper media that is used to quickly de-stabilize ink pigments in the inkjet ink and to reduce a level of bleed of adjacent ink colors. In some circumstances, the inorganic salt in the coating layer may weaken one or both of the adhesion between the coating layer to the fiber base and the adhesion between ink pigments and a surface of the coated paper media. As such, the inkjet ink image printed on the coated paper media may be susceptible to damage that may be acerbated by water or a high humidity environment in a finisher zone of the high speed inkjet printer. In light of the above, in some examples, a polymeric binder is further included in the post-printing treatment fluid to facilitate attachment of the wax particles onto a surface of the printed and dried inkjet ink image, as well as to facilitate bonding of the ink pigments of the inkjet ink image to the coated paper media surface.

In some examples, the polymeric binder includes, but is not limited to, polyvinyl alcohol, polyvinyl alcohol derivative, polyethylene glycol polyethylene glycol derivative, polyurethane, polyvinylpyrrolidone, starch, starch derivative, gelatin, gelatin derivative, cellulose, cellulose derivative, maleic anhydride polymer, maleic anhydride copolymer, acrylic ester polymer, acrylic ester copolymer, polymethylacrylate, polymethylacrylate copolymer, polyacrylamide, a latex resin, combination of two or more polymeric binder materials, or a mixture of two or more polymeric binder materials. The latex resin may be based on at least one of a polymer and a copolymer of styrene butadiene, acrylic, styrene acrylic, styrene methylacrylate, styrene acrylonitrile, styrene maleic anhydride, vinyl acrylic, vinyl acetate, vinyl ester, or vinyl ether, for example.

The amount and type of polymeric binder that may be included in some examples of the post-printing treatment fluid may depend in part on one or more of the nature, the type, and the amount of wax that, is used, for example. In some examples, the amount of polymeric binder in the post-printing treatment fluid is within a range of about 10% to about 90%, or about 10% to about 80%, or about 10% to about 70%, or about 10% to about 60%, or about 10% to about 50%, or about 10% to about 40%, or about 10% to about 30% dry weight. In some examples, the amount of polymeric binder in the post-printing treatment fluid is within, a range of about 20% to about 90%, or about 30% to about 90%, or about 40% to about 90%, or about 50% to about 90% dry weight. In some examples, the amount of polymeric binder in the post-printing treatment fluid is within a range of about 20% to about 80%, or about 30% to about 80%, or about 40% to about 80% dry weight. In some examples, the amount of polymeric binder in the post-printing treatment fluid is at least 20% dry weight, or at least 30% dry weight, or at least 40% dry weight, or at least 50%, or at least 60% dry weight, or about 70% dry weight, or less than about 90% dry weight, or less than or equal to 80% dry weight, for example.

The media substrate may include, but is not limited to, natural cellulosic material; synthetic cellulosic material (such as, for example, cellulose diacetate, cellulose triacetate, cellulose propionate, cellulose butyrate, cellulose acetate butyrate and nitrocellulose); metal material; or material comprising one or more polymers including, but not limited to, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above, for example. In some examples, the media substrate comprises a paper base including, but not limited to, paper stock, cardboard, paperboard, or paper laminated with plastics.

In some examples, the media comprises a base substrate material and a coating or layer of an ink receiving material applied to a surface of the base substrate. For example, the base substrate material may be paper-based and an ink receiving coating may be applied on one or both major sides of the paper base substrate, for example during paper manufacturing. The ink receiving coating may comprise one or more of an inorganic metallic salt, a binder, a filler and an additive. The media may be planar, either smooth or rough, or such other shape that is suitable for the particular purpose for which it is employed. The media may be porous or non-porous, rigid, semi-rigid, or flexible, for example. Planar media may be in the form of, e.g., a film, plate, board, roll or sheet.

In some examples according to the principles described herein, the post-printing treatment fluid provides a substitute for using just water to dispense to printed media that includes printed and dried inkjet ink images on media in a moisturizer zone of inkjet printing. For example, after printing, the ink image enters a drier zone and is subjected to high air temperature (e.g., from about 70° C. to about 200° C., or higher) so that the ink image is dried in a relative short period of time during the printing process. As a result, moisture levels in the printed media can be very low upon exiting the drier zone, e.g., less than about 1% moisture content may be left in paper media after drying. This low moisture content renders the printed media brittle and subject to deformation and damage. The moisturizer zone restores some moisture content in the dried printed media, e.g., to about 2% to about 4%, and puts a layer of just water on the dried ink image on the media. However, the water layer may weaken the ink image and render it susceptible to smearing and rubbing off, for example.

The post-printing treatment fluid, according to the principles described herein substituted for just water in the moisturizer zone provides both water to increase the moisture content of the media and a layer of wax particles on at least a surface of the printed and dried ink image. The wax particles on the surface facilitate resistance of the printed and dried ink images to abrasion including, but not limited to, scratching, smearing and rubbing off, for example. The post-printing treatment at least facilitates the abrasion resistance of the printed media in a finisher zone of inkjet printing. In the examples of the post-printing treatment fluid that further includes a polymeric binder, substituting the post-printing treatment fluid for a layer of just water to restore moisture content further facilitates one or both attachment of the wax particles to the dried ink image surface and bonding of the inkjet ink pigments to the media, surface that may have been weakened by the water alone.

Some examples in accordance with the principles described herein are directed to an inkjet printer that includes a post-printing treatment. FIG. 1 illustrates a block diagram of an inkjet printer (100) according to an example of the principles described herein. The inkjet printer (100) comprises a print zone (120) to print an image on media with an inkjet ink. In some examples, the print zone (120) comprises the inkjet ink, for example an aqueous inkjet ink. The inkjet printer 100 further comprises a dryer zone (140) to dry the printed image of inkjet ink on the media from the print zone (120). The dryer zone (140) comprises one or more of a blower, a fan, an infrared lamp, and an oven to subject the printed media to a relatively high temperature for a short amount of time to dry the printed media.

The inkjet printer (100) further comprises a post-printing treatment zone (160) to dispense a post-printing treatment fluid to printed media comprising the printed and dried image on the media. The post-printing treatment fluid is the post-printing treatment fluid according to the various examples described above. The post-printing treatment zone (160) comprises an applicator and the post-printing treatment fluid. The applicator is configured to dispense the post-printing treatment fluid to a surface of the printed media. The applicator may be one or more of a sprayer, a spin, coaler, a slot die applicator, fountain curtain applicator, blade applicator, rod applicator, air knife applicator, and air brush applicator. The applicator is configured to dispense an amount of the post-printing treatment fluid that is sufficient for both the water to be absorbed by the media and particles of the wax to lie upon a surface of at least the printed and dried Image to facilitate abrasion resistance of the image.

In some examples, the amount of post-printing treatment fluid dispensed to the printed media in the post-printing treatment zone (160) depends on one or more of a type of media used and a denseness of inkjet images on the media surface, for example. For example, the amount of post-printing treatment fluid dispensed to the printed media provides a dry coat weight that is within a range of about 0.1 gram per square meter (gsm) to about 5.0 gsm. In some examples, the amount of the post-printing treatment fluid dispensed to the printed media provides a dry coat weight within the range of about 0.1 gsm to about 4.5 gsm, or about 0.1 gsm to about 4 gsm, or about 0.1 gsm to about 3.5 gsm, or about 0.1 gsm to about 3.0 gsm, or about 0.1 gsm to about 2.5 gsm, or about 0.1 gsm to about 2.0 gsm. In some examples, the amount, of the post-printing treatment fluid dispensed to the printed media provides a dry coat weight that is within the range of about 0.25 gsm to about 5.0 gsm, or about 0.5 gsm to about 5.0 gsm, or about 0.75 gsm to about 5.0 gsm, or about 1.0 to about 5.0 gsm, or about 1.5 gsm to about 5.0 gsm. In some examples, the post-printing treatment fluid is dispensed to the printed media in an amount that provides about 1.0 gsm to about 3.0 gsm dry coat weight in the post-printing treatment zone (160).

The wax particles in the treatment fluid provide a buffer or cushion to the image, and can do so without one or both of curing (e.g., using UV, heat or pressure) the wax particles and application of pressure (e.g., pressure roller) that may coalesce or melt the wax particles into a relatively continuous, wax layer on the surface. The wax particles on the surface include one or both of discrete wax particles and discrete groups or clusters of was particles to provide the cushion to the image on the printed media. In some examples, the wax particles from the post-printing treatment fluid attach to the surface of the image. The wax particles remain on or attached to the surface of the image to facilitate abrasion resistance during subsequent processing or handling by the inkjet printer, for example.

In some examples, the post-printing treatment zone (160) is both configured to facilitate abrasion resistance to the printed, media and to moisturize the printed media. In these examples, the post-printing treatment zone (160) substitutes for a moisturizer zone of an inkjet printer, e.g., of an inkjet web press. In some examples, the inkjet printer (100) further comprises a finisher zone, not illustrated in FIG. 1. Depending on the type of inkjet printer, the finisher zone may one or more of rewind a web of the printed media on an output web roll, cut the output web roll into individual sheets of printed media, stack individual sheets of printed media in an output tray, fold a sheet or multiple sheets together, one or both of bind a stack of sheets into a booklet, and die-cut a sheet or sheets into a specific shape, for example.

Figure 2:
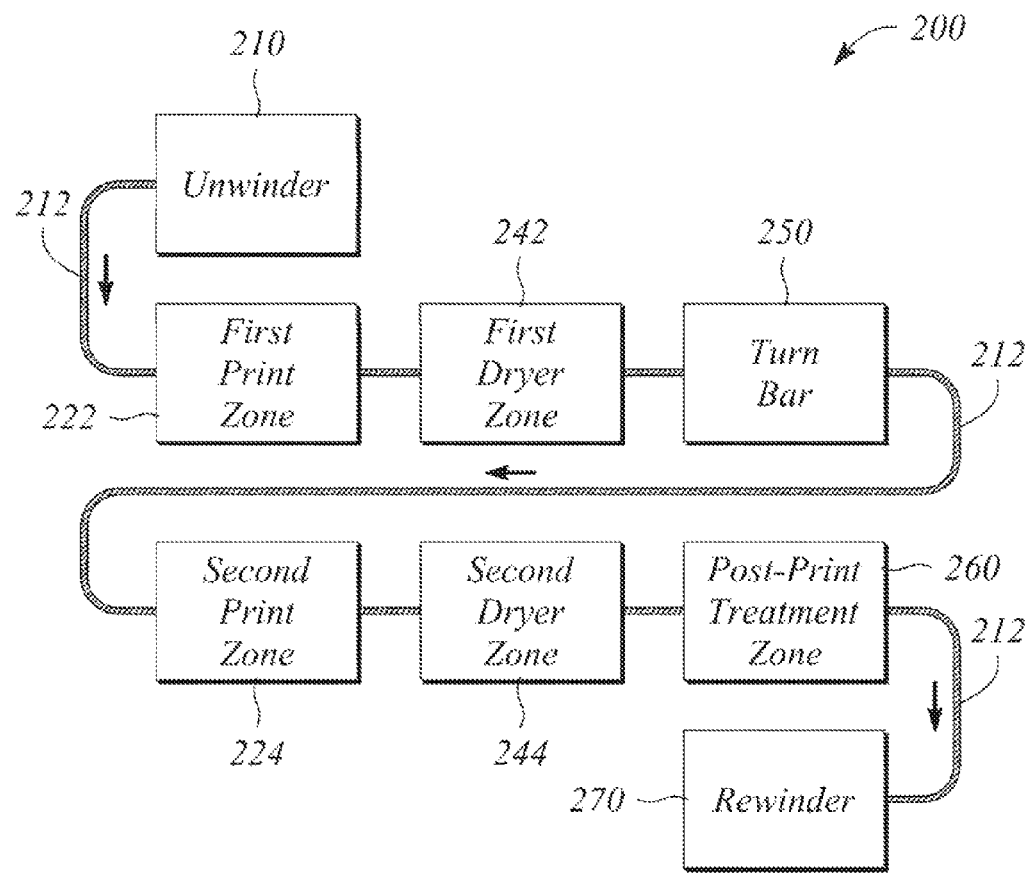
FIG. 2 illustrates a block diagram of an inkjet web press having a post-printing treatment according to an example in accordance with the principles described herein.

Some examples in accordance with the principles described herein are directed to an inkjet web press that includes a post-printing treatment. FIG. 2 illustrates a block diagram of an inkjet web press (200) according to an example of the principles described herein. The inkjet web press (200) comprises a web unwinder (210) configured to unwind a roll of a continuous media web (212). The inkjet web press (200) further comprises a first print zone (222) comprising a printhead and a supply of inkjet ink that is dispensed through the printhead to a first side of the media web (212). The printhead may be either a thermal inkjet printhead or a piezoelectric inkjet printhead. The inkjet web press (200) further comprises a first dryer zone (242) comprising one or more means for drying the printed image on the media web (212). The means for drying include, but are not limited to, one or more of a fan, a blower, infrared element, and an oven to quickly dry the inkjet ink image printed on the media web (212).

In some examples, the inkjet web press (200) further comprises a second print zone (224) and a second dryer zone (244), which are substantially similar to the first print zone (222) and the first dryer zone (242). The second print zone (224) and the second dryer zone (244) are configured respectively to form and to dry an inkjet ink image on an opposite side the media web (212). In these examples, the inkjet web press (200) also further comprises a turn bar (250) between the first dryer zone (242) and the second print zone (224). The turn bar (250) is configured to expose the opposite side of the media web (212) to the printhead of the second, print zone (224).

The inkjet web press (200) further comprises a post-printing treatment, zone (260) that comprises a post-printing treatment fluid and a fluid applicator. The post-printing treatment zone (260) is configured to dispense the post-printing treatment fluid on both sides of the printed and dried media web (232). The fluid applicator includes, hut is not limited to, one or more of a sprayer, a spin coater, a slot die applicator, fountain curtain applicator, blade applicator, rod applicator, air knife applicator, and air brush applicator, configured to dispense the post-printing treatment fluid to both sides of the media web (212). The post-printing treatment fluid is the same as the post-printing treatment fluid according to the various examples described above in accordance with the principles herein. In some examples, the post-printing treatment zone (260) replaces or substitutes for a moisturizer zone of an inkjet web press.

In some examples, either the inkjet printer (100) or inkjet web press (200) provides high-speed printing and as such, the respective dryer zones accommodate the high-speed demand. By 'high-speed printing', it is generally meant inkjet printing at a speed of about 30 meters per minute of web media to about 500 meters per minute of web media, or even higher speed, for example. In some examples, high-speed printing includes within its scope about 10 meters per minute of web media and above. For example, if the printing speed is about 122 meters per minute, and the dryer zone has a linear length of about 3 meters, then, the drying time at this printing speed will be short, amounting to only about 1.5 seconds. In some examples, inkjet ink comprises at least 80% by weight water or other volatile liquid. Therefore, the dryer zone in an inkjet web press usually uses high drying air temperature and airflow velocity to remove water and other volatile liquid from the printed images in such short amount time. For example, the air temperature may be 200° C. or higher for a coated paper media, and airflow velocity may be as high as about 370 cubic meters per minute to dry the inkjet ink image in the respective dryer zone.

In some examples, the post-printing treatment fluid, used in either the inkjet printer (100) or the inkjet web press (200) comprises about 10% to about 90% dry weight of wax and about 10% to about 90% dry weight of polymeric binder in water, in some examples, the post-printing treatment fluid comprises about 10% to about 50% dry weight of wax and about 30% to about 80% dry weight of polymeric binder in water.

Referring back, to FIG. 2, in some examples, the inkjet web press (200) further comprises a rewinder (270) to rewind the post-printing treated web media (212) into a web roll. The post-printing treatment fluid dispensed on the opposite sides of the web media (212) in the post-priming treatment zone (260) facilitates abrasion resistance of the images at least in the rewinder (270) and improves durability of the web media (212). The abrasion resistance and improved durability provided by the post-printing treatment fluid may farther facilitate the printed media integrity during finishing, such as cutting of the web roll into individual sheets and packaging of the sheets, for example, in some examples, the inkjet web press (200) further comprises a first visual station, for example after the first dryer zone (242) and a second visual station, for example after the second dryer zone (244). The visual stations allow for visual inspection of the respective printed and dried inkjet images on the web media (212).

Figure 3:
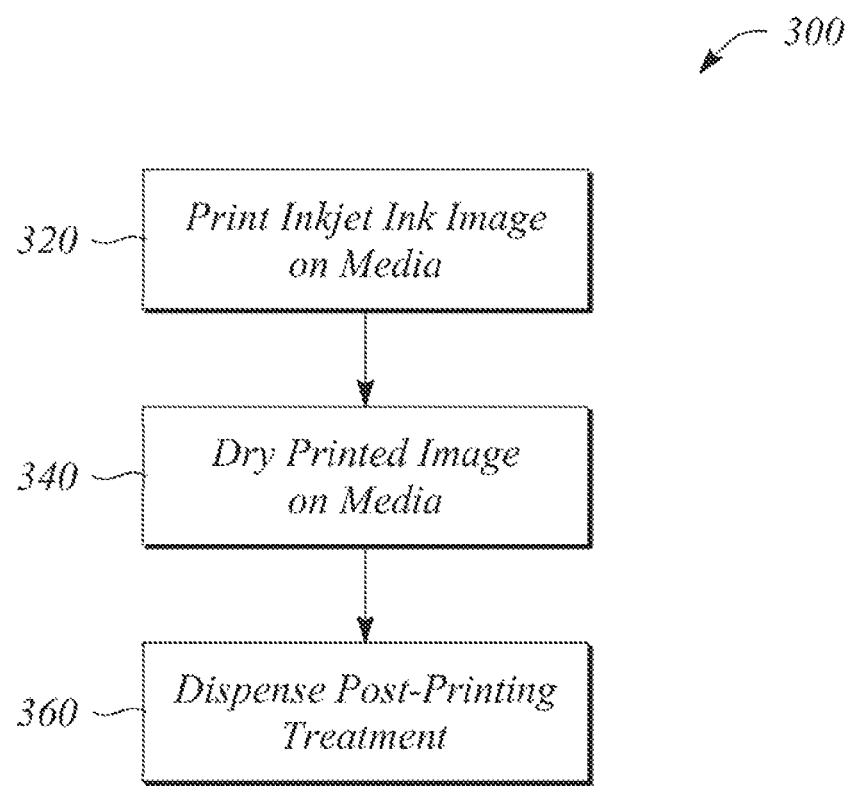
FIG. 3 illustrates a flow chart of a method of forming printed media that includes a post-printing treatment according to an example in accordance with the principles described herein.

Some examples in accordance with the principles described herein am directed to a method of forming printed media that includes a post-printing treatment. FIG. 3 illustrates a flow chart of a method (300) of forming printed media according to an example of the principles described herein. The method (300) of forming printed media comprises printing (320) an image on media with an inkjet ink. In some examples, printing (320) is performed using an inkjet printer having a print-head, e.g., a thermal inkjet printhead or a piezoelectric inkjet printhead. In some examples, the image is printed (320) in a print zone of the inkjet printer. The method (300) of forming printed media further comprises drying (340) the printed, image on the media, e.g., using one or more convection, conduction, infra-red radiation, atmospheric exposure, or a combination of two or more of these, for example, in some examples, drying (340) the printed image on the media, includes using one or more of a fan, a heater, a blower, and an oven. In some examples, the printed image is dried (340) in a dryer zone of an inkjet printer.

The method (300) of forming printed media further comprises a post-printing treatment of the printed media. The post-printing treatment comprises dispensing (360) a post-printing treatment fluid on printed, media that comprises the printed and dried inkjet ink image on the media. The post-printing treatment fluid comprises a wax suspended in water. An amount of the post-printing treatment fluid dispensed (360) to the printed media is sufficient for both the water to be absorbed by the media and particles of the wax to be upon at least the image, in some examples, the amount of the post-printing treatment fluid dispensed (360) depends on one or both of a type of media used and a denseness of the inkjet image printed on the media surface. The particles of wax on the surface of the image are configured to facilitate abrasion resistance of the image, in some examples, the abrasion resistance provided to the image as well as the moisture provided to the media improves durability of the printed media.

In some examples, the inkjet printer used to form printed media according to the method (300) is substantially the same as the inkjet printer (100) or the inkjet web press (200) described above, in some examples of the method (300), the post-printing treatment is performed off-line relative to in-line printing (320) the image on the media and in-line drying (340) the image on the media using an inkjet printer. In the examples where the post-printing treatment is performed off-line, the post-printing treatment fluid is dispensed (360) to the printed media using an off-line applicator device including; but not limited to, a spray coater, a spin coater, a slot die applicator, fountain curtain applicator, blade applicator, rod applicator, air knife applicator, or air brush applicator.

Some examples in accordance with the principles described herein are directed to a printed media that includes a post-printing treatment. The printed media comprises a media substrate (or 'media'); an inkjet ink image printed and dried on the media, and panicles of a wax on at least the inkjet ink image. In some examples, the inkjet ink used to form the image is an aqueous inkjet ink. When the printed media is dried most of the water is removed from the image and the media. The post-printing treatment provides some rehydration of the media (i.e., moisturize) as well as provides the wax particles on the surface to facilitate abrasion resistance of the image. In some examples, the printed media according to the principles described herein has improved durability relative to printed media without post-printing treatment or that has been moisturized with just water.

Specific examples and evaluations of the post-printing treatment are provided below.

EXAMPLES

All measured values are within measurement tolerance for the equipment used, unless otherwise indicated.
Preparation of Rub Resistance Samples
Preparation of Post-Printing Treatment Fluid Resistance Examples:
Three Fluid Resistance Examples (1-3) were prepared using the chemical ingredients listed in Table 1. For each Example, the chemicals were mixed together in a beaker with water using normal bench stirring equipment. The amount of water added to each Example was sufficient to achieve a solids content of 5% by weight. The chemicals were stirred until a homogeneous mix was obtained.

TABLE 1

| Ingredients | Example 1 | Example 2 | Example 3 |
|---|---|---|---|
| Wax | Ultralube ® MD-2100 | Ultralube ® MD-2100 | Ultralube ® D-815 |
| Wax amount (dry parts) | 30 | 30 | 30 |
| Polymeric Binder | Acronal ® S 728 | Lucidene ™ 645 | Acronal ® S 728 |
| Binder amount (dry parts) | 70 | 70 | 70 |
| Additive - Surfactant 1 | Tego ® Wet 510 | Tego ® Wet 510 | Tego ® Wet 510 |
| Amount of Surfactant 1 (dry parts) | 0.5 | 0.5 | 0.5 |
| Additive - Surfactant 2 | APG ® 325 N | APG ® 325 N | APG ® 325 N |
| Amount of Surfactant 2 (dry parts) | 0.5 | 0.5 | 0.5 |
| Solids (weight percent) | 5 | 5 | 5 |

Ultralube® MD-2100 is a non-ionic high density polyethylene (HDPE) wax micro dispersion, having a 50% by weight solids content, a small particle size distribution, spherical shape and particle diameter between 0.2 microns and 2.0 microns (mean particle diameter between 0.5 microns to 1.0 micron), supplied by Keimadditec Surface GmbH, Kirchberg/Hunsrück, Germany. Ultralube® D-815 is polyethylene wax dispersion having 45% by weight solids content, with an average panicle size of about 4 microns. Acronal® S 728 is a styrene-butyl acrylate copolymer polymeric binder manufactured by BASF, Charlotte, N.C., USA. Lucidene™ 645 is an acrylic urethane polymeric binder manufactured by Rohm and Haas Company, Philadelphia, Pa., USA, Tego® Wet 510 is a silicone-free, non-ionic organic surfactant manufactured by Evonik Industries AG, Essen, Germany, APG® 325 N is a decyl/undecyl Glucoside (APG refers to alkyl polyglucoside) surfactant manufactured by Cognis Corp., North Rhine-Wesphalia, Germany.

Preparation of Printed Media Resistance Samples:
Cut sheets of paper media, Utopia Inkjet Dull 80 lb. (216 gsm) Cover (9 pt), from Appleton Coated, Combined Locks, WI, were printed with four (4) solid-color blocks, red, blue, green and black, using an HP 1200 inkjet Web Press, Hewlett-Packard, Palo Alto, Calif., and Hewlett-Packard (HP) aqueous inkjet ink A50 to produce the Printed Media Resistance Samples.

Preparation of Post-Printing Treated Resistance Samples:
One Sample sheet each of the Printed Media Resistance Samples were coated with a different one of the Treatment Fluid Resistance Examples (1-3) from Table 1 using a Meyer rod #0. The coated samples were dried using a normal heat gun in a laboratory setting to produce the Post-Printing Treated Resistance Samples, with a dry coat weight of the Treatment Fluid Resistance Example coatings of less than about 2 gsm.

Rub Resistance Evaluation:
A Model 5750 Linear Abraser made by Taber Industries, North Tonawanda, N.Y., was used to evaluate rub resistance of the Post-Printing Treated Resistance Samples and a Control Sample (an un-treated Printed Media Resistance Sample). During the evaluation, an additional force of 250 grams was added onto the Linear Abraser probe, that provided a total force of 850 grams. A piece of Texwipe fabric, TX 609, from ITW Texwipe, Kernersville, N.C., was pre-wetted in deionized (DI) water and then attached to the probe. The probe was rubbed on a color image block for one full cycle of back and forward. Alter rubbing, the probe was lifted and the Texwipe fabric was removed from the probe.

An amount of the printed and dried ink that transferred to the Texwipe fabric was measured by optical density using a Spectro-densitometer Model 938, supplied by X-rite, Green Rapids, Mich. with a setting of DBN-A. Table 2 summarizes the optical density results of the transferred ink taken for each color block (red, green, blue, and black) of the evaluated Resistance Samples. The lower the optical density values, the less ink transferred to the Texwipe fabric and the more stable was the linage. Sample 1 in Table 2 has Treatment Fluid Example 1 dispensed on it. Sample 2 has Treatment Fluid Example 2 dispensed on if and Sample 3 has Treatment Fluid Example 3 dispensed on it.

TABLE 2

| Ink Color | Red | Green | Blue | Black |
| --- | --- | --- | --- | --- |
| Resistance Control Sample | 62.3 | 81.9 | 74.3 | 36.2 |
| Sample 1 | 8.9 | 13.9 | 15.9 | 18.9 |
| Sample 2 | 1.7 | 4.9 | 9.7 | 1.0 |
| Sample 3 | 17.5 | 26 | 13.9 | 25.1 |

The results in Table 2 illustrate that the post-printing treatment fluid had a significant positive impact on rub resistance of the printed color images relative to the control sample that did not include a post-printing treatment as described herein.

Preparation of Durability Samples

Preparation of Post-Printing Fluid Durability Examples:

Two Fluid Examples (4-5) were prepared using wax formulations listed in Table 3, wherein the wax used represents two different size wax particles. Ultralube® E-846 is a nonionic HDPE wax emulsion having 40% by weight solids content, a small particle size distribution, spherical shape and particle size diameter between 0.01 micron and 0.5 micron; and Ultralube® MD-2030 is a nonionic modified HDPE wax dispersion with 50% by weight solids content, a small particle size distribution, spherical shape and particle diameter between 0.2 micron and 1.0 micron (mean particle diameter from 0.3 micron to 0.7 micron), both from Keimadditec. The Fluid Examples 4-5 were each diluted with water to 0.1%, 1% and 5% by weight solids content of the wax.

TABLE 3

| Ingredients | Example 4 | Example 5 |
| --- | --- | --- |
| Wax | Ultralube ® E-846 | Ultralube ® MD-2030 |
| Percent Solids | 0.1%, 1% & 5% | 0.1%, 1% & 5% |

Preparation of Printed Media Durability Samples:

Paper media (Utopia Inkjet Gloss 100# test, from Appleton Coated) were printed with HP A50 aqueous inkjet ink using an HP Edgeline CM8060 printer to produce the Printed Media Durability Samples. Each Print Media Durability Sample had a continuous block of printed ink and a non-printed area directly below the printed block.

Preparation of Post-Printing Fluid Durability Samples:

The Treatment Fluid Durability Examples 4-5 at different percent solids were coated on the Printed Media Durability Samples using Meyer rods #0 and #5 (at wet coat weight of 0.5 gsm to 12.5 gsm) to test the different wax loadings of 0.1%, 1% and 5% (solids by weight) and different wax particle size ranges. The higher solids content of the wax in the Treatment Fluid (Examples 4-5) allowed for less of the Fluid to be applied to achieve about same amount of wax on the Samples, for example. Moreover, the Meyer rod #5 put more Treatment Fluid on the Samples compared to the Meyer rod #0. The coated samples were dried using a heat gun in a laboratory setting to produce the Post-Printing Treated Durability Samples. A sheet of each experimental condition (e.g., each of 0.1%, 1% and 5% solids content Samples of each Example 4-5) was evaluated.

Durability Evaluation:

A Sutherland rub test (ASTM D 5264) was performed on the printed area of the Post-Printing Treated Durability Samples and a Control Printed Media Durability Sample having no Treatment Fluid. In particular, a 1.8 kilogram weight was used to rub from the printed area to the directly adjacent non-printed area below the printed area using five (5) cycles.

The results of the Durability Evaluation show that the Control. Durability Sample (without any Post-Printing Treatment Fluid) had considerable damage to the print area with heavy scratching and a lot of ink removed as well as considerable ink that was transferred to the respective non-printed area below. The durability results for Example 4, applied using Meyer rod #0, were quite different from, the Control Durability Sample. At the 0.1% level for Example 4, only a slight amount of damage was visible to the print area, but some ink did transfer to the non-print area (below the printed ink area). However, there was an improvement in print area durability compared to the Control Durability Sample. At the 1% level for Example 4, no damage to the print area, was visible and only a very small amount of ink transferred to the non-print area below. At the 5% level for Example 4, no damage and no ink transfer was visible. The durability results for Example 5 (and Meyer rod #0) showed a very similar trend to the results for Example 4. Moreover, the durability results for Examples 4-5 (at 0.1%, 1% and 5% levels), applied using Meyer rod #5, each showed a similar trend and relatively better results than the Meyer rod #0 results, which may be due to relatively more of the Treatment Fluid (i.e., more wax) applied to the Samples.

Thus, there have been described examples of a post-printing treatment for printed, media, and an inkjet printer and a method of forming printed media that include the post-printing treatment it should be understood that the above-described examples are merely illustrative of some of the many specific examples that represent the principles of what is claimed. Clearly, those skilled in the art can readily devise numerous other arrangements without departing from the scope defined by the following claims.

What is claimed is:

1. An inkjet printer comprising:
    a printing zone to print an image on media with an aqueous inkjet ink;
    a drying zone to dry the image on the media by removing water from the image and the media; and
    a post-printing treatment zone after the drying zone to dispense an amount of a post-printing treatment fluid on the media having the printed and dried image, the post-printing treatment fluid comprising wax particles suspended in water, the amount of the post-printing treatment fluid dispensed being sufficient for both the water to be absorbed by the media to moisturize the media and the wax particles to lie upon at least the image to facilitate abrasion resistance of the image;
    wherein the inkjet printer is not configured to apply heat or pressure to the wax particles, wherein an amount of the wax particles in the post-printing treatment fluid ranges from about 10% to about 50% dry weight, and wherein the post-printing treatment fluid further comprises one or both of a water soluble polymeric binder or a water miscible polymeric binder in a total amount ranging from about 30% to about 80% dry weight.

2. The inkjet printer of claim 1, wherein the polymeric binder comprises polyvinyl alcohol, polyvinyl alcohol derivative, polyethylene glycol, polyethylene glycol derivative, polyurethane, polyvinylpyrrolidone, starch, starch derivative, gelatin, gelatin derivative, cellulose, cellulose derivative, maleic anhydride polymer, maleic anhydride copolymer, acrylic ester polymer, acrylic ester copolymer, polymethylacrylate, polymethylacrylate copolymer, polyacrylamide, a latex resin, a combination of two or more thereof, or a mixture of two or more thereof.

3. The inkjet printer of claim 1, wherein the wax particles comprise particles of polyethylene, polypropylene, polybutadiene, polytetrafluoroethylene, polyvinylfluoride, polyvinylidene fluoride, polychlorotrifluoroethylene, perfluoroalkoxy polymer, polyethylenechlorotrifluoroethylene, perfluoropolyether, polyethylene-vinyl acetate, polyurethane, epoxy resin, silicone resin, polyamide resin, polyester resin, carnauba wax, paraffin wax, montan wax, candelilla wax, ouricury wax, sufarcane wax, retamo wax, beeswax, a combination of two or more thereof, or a mixture of two or more thereof.

4. A printed media formed using the inkjet printer of claim 1, the printed media comprising the media having a paper base, the inkjet ink image printed and dried on the paper-based media, and the wax particles on a surface of at least the inkjet ink image.

5. The printed media of claim 4, wherein the wax particles on the surface include discrete wax particles, discrete clusters of wax particles, or combinations thereof, providing cushion to the inkjet ink image.

6. The inkjet printer of claim 1, wherein the printer does not cure the wax particles.

7. The inkjet printer of claim 1, wherein the wax particles have a mean particle diameter of 0.3 microns to about 4 microns.

8. The inkjet printer of claim 1, wherein the polymeric binder is an acrylic urethane polymeric binder.

9. An inkjet printer comprising:
a first printing zone comprising aqueous inkjet ink dispensed through a printhead to form an image on media;
a first drying zone to dry the image of inkjet ink on the media by removing water from the image and the media;
a second printing zone and a second drying zone to form and to dry, respectively, another image on an opposite side of the media with the inkjet ink; and
a post-printing treatment zone to dispense a post-printing treatment fluid on opposite sides of the media having printed and dried images, the post-printing treatment fluid comprising both about 10% to about 50% dry weight of wax particles and about 30% to about 80% dry weight of one or both of a water soluble polymeric binder or a water miscible polymeric binder in water, the wax particles to lie upon at least the printed and dried images to facilitate abrasion resistance of the images.

10. The inkjet printer of claim 9, wherein an amount of the post-printing treatment fluid to be dispensed is sufficient for the media to absorb the water to moisturize the printed media.

11. The inkjet printer of claim 9 being a high-speed web press.

12. The inkjet printer of claim 9, wherein the media moves from the first drying zone directly to the second printing zone by way of a turn bar.

13. A method of forming printed media, the method comprising:
printing an image on media with an aqueous inkjet ink;
drying the image of inkjet ink on the media by removing water from the image and the media; and
dispensing an amount of a post-printing treatment fluid on the media having the printed and dried image, the post-printing treatment fluid comprising wax particles suspended in water, wherein the amount of the post-printing treatment fluid dispensed is sufficient for both the water to be absorbed by the media to moisturize the media and the wax particles to lie upon at least the image to facilitate abrasion resistance of the image;
wherein heat and pressure are not applied to the wax particles on the image, wherein an amount of the wax particles in the post-printing treatment fluid ranges from about 10% to about 50% dry weight, and wherein the post-printing treatment fluid further comprises one or both of a water soluble polymeric binder or a water miscible polymeric binder in a total amount ranging from about 30% to about 80% dry weight.

14. The method of claim 13, wherein the printing of the image and the drying of the image are performed in-line with an inkjet printer, the dispensing of an amount of the post-printing treatment fluid is performed off-line relative to the inkjet printer.

15. The method of claim 13, wherein the amount of the post-printing treatment fluid dispensed provides a dry coat weight on the media within a range of about 0.1 gram per square meter (gsm) to about 5.0 gsm.

16. The method of claim 13, wherein the wax particles are not cured.

17. The method of claim 13, wherein the post-printing treatment fluid is not dried after being dispensed on the media.

18. An inkjet printer comprising:
a first printing zone comprising aqueous inkjet ink dispensed through a printhead to form an image on media;
a first drying zone to dry the image of inkjet ink on the media by removing water from the image and the media;
a second printing zone and a second drying zone to form and to dry, respectively, another image on an opposite side of the media with the inkjet ink; and
a post-printing treatment zone to dispense a post-printing treatment fluid on opposite sides of the media having printed and dried images, the post-printing treatment fluid comprising wax particles suspended in water, wherein an amount of the wax particles in the post-printing treatment fluid ranges from about 10% to about 50% dry weight, and wherein the post-printing treatment fluid further comprises one or both of a water soluble polymeric binder or a water miscible polymeric binder in a total amount ranging from about 30% to about 80% dry weight.

* * * * *